United States Patent

Lee

[11] Patent Number: 6,058,398
[45] Date of Patent: *May 2, 2000

[54] METHOD FOR AUTOMATICALLY LINKING INDEX DATA WITH IMAGE DATA IN A SEARCH SYSTEM

[75] Inventor: Min-Jae Lee, Seoul, Rep. of Korea

[73] Assignee: Daewoo Electronics Co., Ltd., Seoul, Rep. of Korea

[*] Notice: This patent is subject to a terminal disclaimer.

[21] Appl. No.: 09/317,224

[22] Filed: May 24, 1999

Related U.S. Application Data

[63] Continuation of application No. 08/758,487, Nov. 29, 1996.

[51] Int. Cl.[7] .................................................. G06F 17/00
[52] U.S. Cl. ................................ 707/104; 707/2; 707/7; 707/102
[58] Field of Search ................................ 395/788; 707/2, 707/7, 104, 512, 3, 8; 706/59; 345/331; 386/124

[56] References Cited

U.S. PATENT DOCUMENTS

| | | | |
|---|---|---|---|
| 4,760,526 | 7/1988 | Takeda et al. | 707/7 |
| 4,941,125 | 7/1990 | Boyne | 707/104 |
| 5,179,652 | 1/1993 | Rozmanith et al. | 345/331 |
| 5,241,671 | 8/1993 | Reed et al. | 707/104 |
| 5,440,401 | 8/1995 | Parulski et al. | 386/124 |
| 5,493,677 | 2/1996 | Balogh et al. | 707/104 |
| 5,551,021 | 8/1996 | Harada et al. | 707/104 |
| 5,623,681 | 4/1997 | Rivette et al. | 395/788 |
| 5,787,416 | 7/1998 | Tabb et al. | 707/2 |
| 5,809,318 | 9/1998 | Rivette et al. | 707/512 |
| 5,822,745 | 10/1998 | Hekmatpour | 706/59 |

OTHER PUBLICATIONS

Johnson, "The Signal Processing Information Base: A Road to Electronic Information Exchange", IEEE, Jun. 1994, pp. 139–141.

*Primary Examiner*—Wayne Amsbury
*Assistant Examiner*—Thuy Pardo
*Attorney, Agent, or Firm*—Pillsbury Madison & Sutro LLP

[57] ABSTRACT

A method for automatically linking index data with image data is disclosed. A first recording medium has both an index data base and first link data recorded thereon, and a second recording medium has both an image data base and second link data recorded thereon. The separate first link data which is not related to a search item, is added to each of record units of the index data base. The second link data is a label or a key chord which is connectively operated with the first link data. Accordingly, in the search system, the index list which is obtained by the search operation, is linked at a high rate with the image data which is recorded on the majority of recording media. Therefore, the minority of the first recording media having the index data base recorded thereon is linked automatically by the first and second link data with the majority of the second recording media having the image data base or a different form of data base recorded thereon so that the search operation is performed at a high rate. Also, when the search system is introduced into a network system, a separate linking software is not required.

2 Claims, 3 Drawing Sheets

METHOD FOR AUTOMATICALLY LINKING INDEX DATA WITH IMAGE DATA IN A SEARCH SYSTEM

This is a continuation of application Ser. No. 08/758,487, filed Nov. 29, 1996.

BACKGROUND OF THE INVENTION

1. Field of the Invention

The present invention relates to a method for automatically linking index data with image data in a search system.

2. Description of the Prior Art

FIG. 1 is a flowchart for illustrating a search method using an index data base in a conventional search system. As shown in FIG. 1, in step S1, a user enters first search data. For example, in a patent search system, the first search data includes a patent number, an international classification, applicant(s), a publication number, keywords and so on. In step S2, a first search is performed on the basis of the first search data which is entered in step S1. In step S3, an index list, such as index data, which is equivalent to an -15 output of the first search which is performed in step S2, is displayed. In step S4, the user selects an item among the index list which is displayed in step S3. In step S5, first data which is equivalent to an item among the index list which is selected in step S4, is displayed. For example, in the patent search system, the first data is equivalent to summarized patent-relevant data. In step S6, the first data which is displayed in step S5, is stored on an external recording medium or is printed on a print medium.

FIG. 2 is a flowchart for illustrating a search method using an image data base in a conventional search system. As shown in FIG. 2, in step S10, a user enters second search data. For example, in a patent search system, the second search data is a patent number, a publication number and so on. In step S20, a second search is performed on the basis of the second search data which is entered in step S10. In step S30, image data which is an output of the second search which is performed in step S20, is displayed. For example, in the patent search system, the image data is equivalent to the whole sentence of a patent gazette and drawings thereof. In step S40, the image data which is displayed in step S30, is stored on an external recording medium or is printed on an print medium.

In a patent search system which is an example of the above-described conventional search system, the summarized patent-relevant particulars are recorded on a first recording medium, e.g., a compact disc read only memory which has an index data base recorded thereon. The whole sentence of a patent gazette and drawings thereof are recorded on a second recording medium which has an image data base recorded thereon. Since the first and second recording media are respectively searched by search softwares which are different from each other, the two searches cannot be combined. Thus, since a user must conduct two separate searches when performing a patent search with the conventional patent search system, the user spends a lot of time conducting the patent search.

Also, in another conventional patent search system, the index data base, the image data base and link information data for linking the two data bases are recorded on a recording medium, e.g., compact disc read only memory. However, in this case, as the number of the recording media increases, a patent search such as an index search must be performed with respect to each of the recording media. Therefore, the user inevitably spends a lot of time conducting the search under a cumbersome search process.

The two above-described search systems cannot be used in a network system such as a local area network. Also, although the two search systems are so configured that they can be used in the network system through the medium of a separate software, the user must spend a lot of time searching with the search system which is linked to the network system.

SUMMARY OF THE INVENTION

Therefore, it is a first object of the present invention to provide a method for automatically linking index data with image data in a search system, and which has a signal system for linking a plurality of data which are recorded on separate recording media on the basis of their respective characteristics.

It is a second object of the present invention to provide the method for automatically linking index data with image data in a search system, and which displays an index list at a high rate during a search operation by recording an index data base on each of the minority of recording media.

It is a third object of the present invention to provide the method for automatically linking index data with image data, and which links at a high rate the index list obtained by the search operation with the image data recorded on the majority of recording media.

In order to achieve the above objects, the present invention provides the method for automatically linking index data with image data in a search system, which comprises the steps of:

(i) inputting a search data such as a keyword;

(ii) performing a search on the basis of the search data inputted in step (i);

(iii) outputting a result of the search performed in step (ii);

(iv) determining whether or not an image display command is inputted;

(v) loading a relevant compact disc read only memory into a drive when it is determined in step (iv) that the image display command is inputted.

(vi) determining whether or not a first link data of a first recording medium connects with a second link data of a second recording medium when it is determined in step (v) that the relevant compact disc read only memory is loaded into the drive; and (vii) outputting a linked image data such as drawings recorded on the second recording medium when it is determined in step (vi) that the first link data connects with the second link data.

In the method for automatically linking index data with image data in a search system, the minority of the first recording media having the index data base recorded thereon is linked automatically by the first and second link data with the majority of the second recording media having the image data base or a different form of data base recorded thereon so that the search operation is performed at a high rate. Also, when the search system is introduced into a network system, a separate linking software is not required.

BRIEF DESCRIPTION OF THE DRAWINGS

The above objects and other advantages of the present invention will become more apparent by describing in detail a preferred embodiment thereof with reference to the attached drawings, in which.

DESCRIPTION OF THE PREFERRED EMBODIMENT

A description will be given below in detail with reference to the accompanying views to a method for automatically linking index data with image data in a search system according to an embodiment of the present invention.

Figure 1:
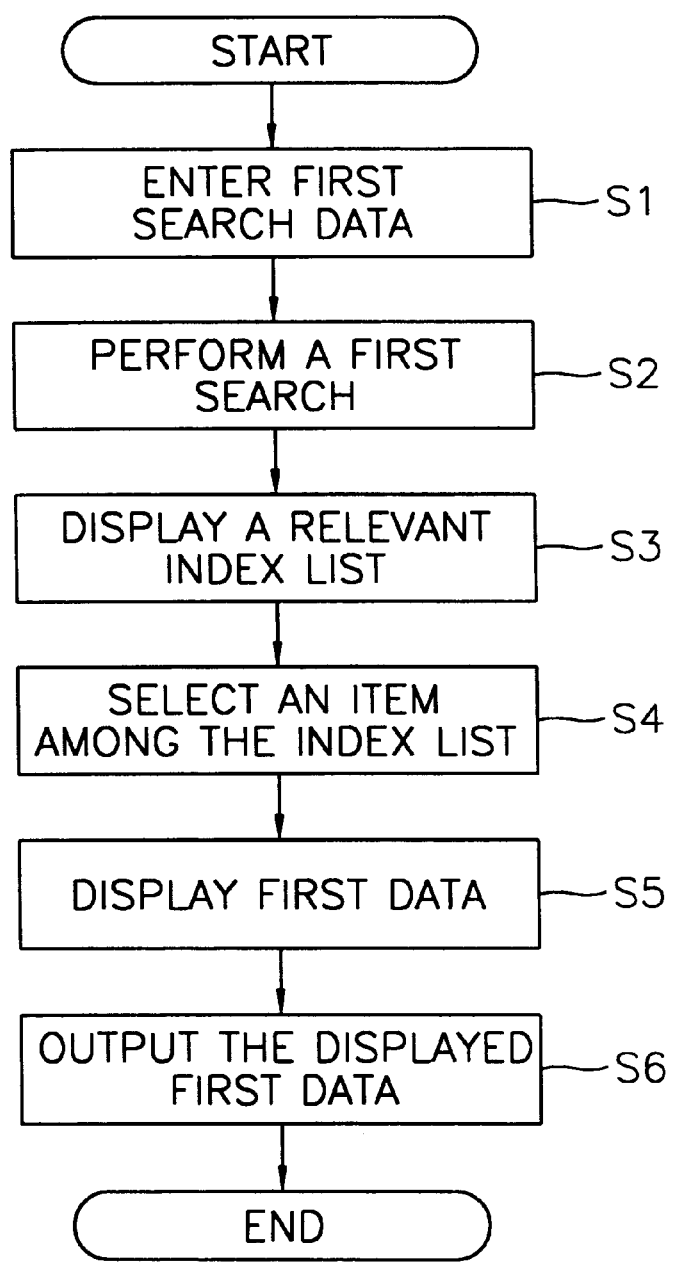
FIG. 1 is a flowchart for illustrating a search method using an index data base in a conventional search system.
Figure 2:
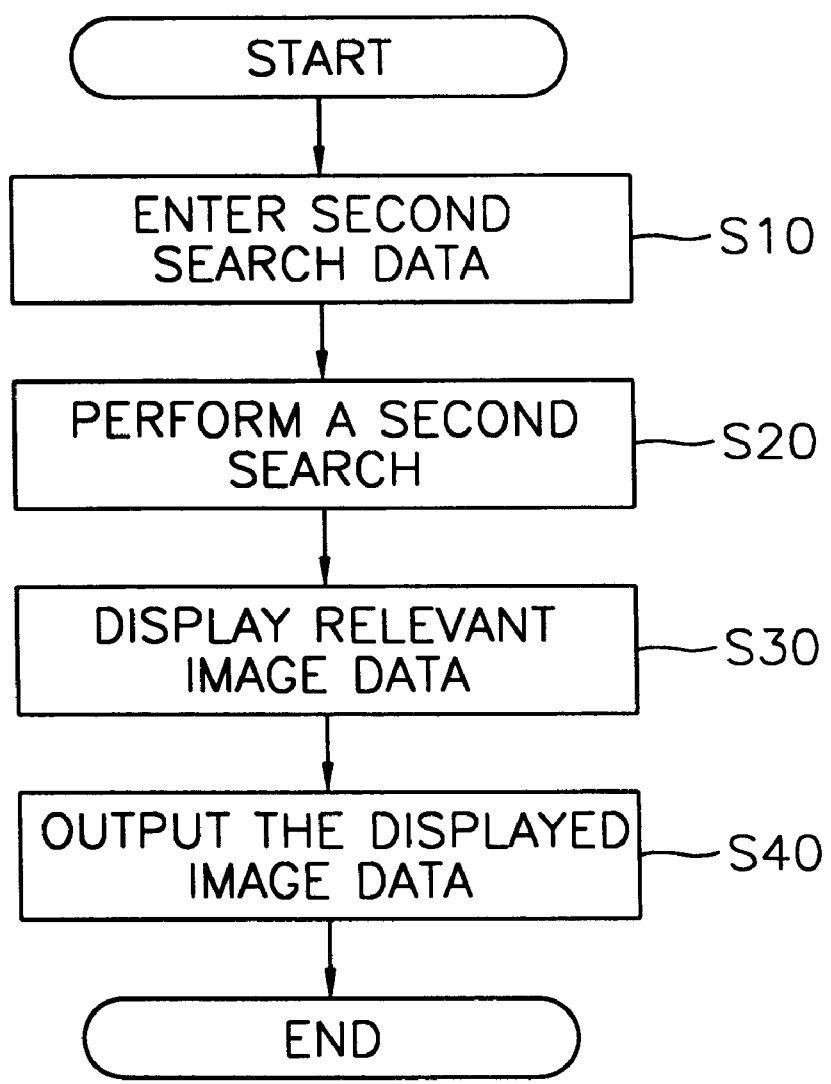
FIG. 2 is a flowchart for illustrating a search method using an image data base in a conventional search system.
Figure 3:
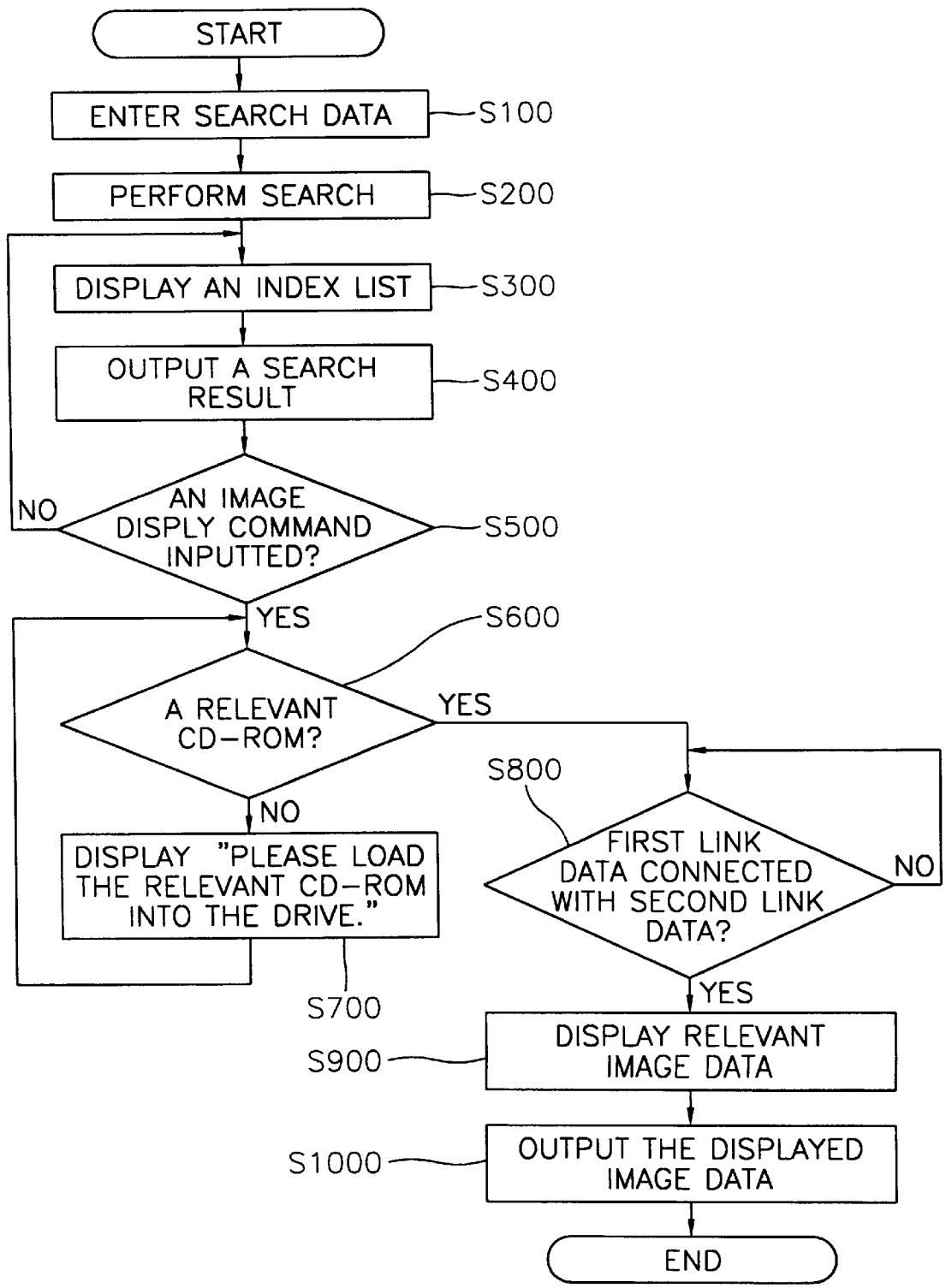
FIG. 3 is a flowchart for illustrating a search method according to an embodiment of the present invention.

FIG. 3 is a flowchart for illustrating a search method according to an embodiment of the present invention. As shown in FIG. 3, a user enters search data in step S100. For example, in a patent search system, the search data includes a patent number, an international classification, applicant(s), a publication number, keywords and so on. In step S200, a controlling section performs a search procedure on the basis of the search data which is inputted in step S100.

In step S300, the controlling section displays an index list which is included the result of the search which is performed in step S200. In step S400, when an item is selected by the user among the index list which is displayed in step S300, the controlling section stores a corresponding search result on a recording medium or prints the corresponding search result on a print medium. Namely, in steps S300 and S400, the result of the search which is performed in step S200 is outputted.

In step S500, the controlling section determines whether or not an image display command is inputted by the user. When it is determined in step S500 that the image display command is not inputted, the controlling section returns the procedure to step S300. When it is determined in step S500 that the image display command is inputted, the controlling section makes the procedure proceed to step S600.

In step S600, the controlling section determines whether or not a relevant compact disc read only memory is loaded into a drive. In step S700, when it is determined in step S600 that the relevant compact disc read only memory is not loaded into the drive, the controlling section displays the message, "Please load the relevant compact disc read only memory into the drive". and returns the procedure to step S600. When it is determined in step S600 that the relevant compact disc read only memory is loaded into the drive, the controlling section makes the procedure proceed to step S800. Namely, in steps S600 and S700, when it is determined in step S500 that the image display command is inputted by the user, the relevant compact disc read only memory is loaded into the drive.

In step S800, the controlling section determines whether or not a first link data of a first recording medium is connected with a second link data of a second recording medium. When it is determined in step S800 that the first link data is not connected with the second link data, the controlling section repeats step S800. When it is determined in step S800 that the first link data of the first recording medium is connected with the second link data of the second recording medium, the controlling section makes the procedure proceed to step S900.

In step S900, the controlling section displays the linked image data of the second recording medium. In step S1000, the controlling section stores on a recording medium the image data which is displayed in step S900 or prints the displayed image data on a print medium. Namely, the controlling section outputs the linked image data which is recorded on the second recording medium. For example, in the patent search system, the image data is equivalent to the whole sentence of a patent gazette and drawings thereof.

The first recording medium has both an index data base and the first link data recorded thereon, and the second recording medium has both an image data base and the second link data recorded thereon. The first link data is a separate link signal which is added to each of record units of the index data base and which is not related to a search item. The second link data is a label or a key chord which is connectively operated with the first link data which is added to each of record units of the index data base.

In the method for automatically linking index data with image data in a search system, the minority of the first recording media having the index data base recorded thereon are linked automatically by the first and second link data with the majority of the second recording media having the image data base or a different form of data base recorded thereon so that the search operation is performed at a high rate. Also, when the search system is introduced into a network system, a separate linking software is not required.

While the present invention has been particularly shown and described with reference to a particular embodiment thereof, it will be understood by those skilled in the art that various changes in form and detail may be effected therein without departing from the scope of the invention as defined by the appended claims.

What is claimed is:

1. A method for automatically linking text data with image data in a computer-based search system, said method comprising the steps of:
   (i) inputting a search data such as a keyword;
   (ii) searching on the basis of the search data inputted in step (i) in a text-data memory;
   (iii) outputting a result of the search performed in step (ii);
   (iv) determining whether or not an image display command has been input;
   (v) loading an image-data memory when it is determined in step (iv) that the image display command has been input;
   (vi) determining whether or not a first link data of the text-data memory is connected with a second link data of the image-data memory; and
   (vii) outputting one or more images, stored in the image-data memory, linked with one or more searched data when it is determined in step (vi) that the first link data is connected with the second link data,
   wherein the text-data memory has both an index database and the first link data recorded thereon, where said first link data is a separate link data which is added to each of records of the index database, and the image-data memory has both an image database and the second link data recorded thereon.

2. A method for automatically linking text data with image data in a computer-based search system, said method comprising the steps of:
   (i) inputting a search data using a display monitor;
   (ii) searching a text database for one or more records relevant to the search data input in step (i);

(iii) displaying located records on the display monitor;
(iv) checking whether or not a command to display image data, which are stored in an image database, linked with one or more records selected from the located records has been input;
(v) in response to the command, searching the image database for the image data on the basis of linkage information between the text database and the image database; and (vii) displaying the image data linked with the selected records and located in step (v) on the display monitor, wherein the linkage information is a separate link data from the text and image databases and has data by which text records of the text database are connected with image data of the image database.

* * * * *